DEVICE COMPRISING AT LEAST ONE SEALING ELEMENT BETWEEN TWO COAXIALLY ARRANGED ELEMENTS WHICH ARE MOVABLE WITH RESPECT TO EACH OTHER

Filed May 27, 1965

INVENTORS
HERMAN FOKKER
ROELF J. MEIJER
GIJSBERT PRAST
KLAAS ROOZENDAAL
BY
AGENT

INVENTORS
HERMAN FOKKER
ROELF J. MEIJER
GIJSBERT PRAST
KLAAS ROOZENDAAL
BY
Frank R. Trifari
AGENT DEVICE COMPRISING AT LEAST ONE SEALING ELEMENT BETWEEN TWO COAXIALLY ARRANGED ELEMENTS WHICH ARE MOVABLE WITH RESPECT TO EACH OTHER Filed May 27, 1965

INVENTORS
HERMAN FOKKER
ROELF J. MEIJER
GIJSBERT PRAST
KLAAS ROOZENDAAL
BY
Frank R. Trifari
AGENT DEVICE COMPRISING AT LEAST ONE SEALING ELEMENT BETWEEN
TWO COAXIALLY ARRANGED ELEMENTS WHICH ARE MOVABLE
WITH RESPECT TO EACH OTHER Filed May 27, 1965 6 Sheets-Sheet 4

INVENTORS
HERMAN FOKKER
ROELF J. MEIJER
GIJSBERT PRAST
KLAAS ROOZENDAAL
BY Frank R. Jifari
AGENT DEVICE COMPRISING AT LEAST ONE SEALING ELEMENT BETWEEN TWO COAXIALLY ARRANGED ELEMENTS WHICH ARE MOVABLE WITH RESPECT TO EACH OTHER Filed May 27, 1965 6 Sheets-Sheet 5

INVENTORS
HERMAN FOKKER
ROELF J. MEIJER
GUSBERT PRAST
KLAAS ROOZENDAAL
BY
Frank R. Jifari
AGENT INVENTORS
HERMAN FOKKER
ROELF J.MEIJER
GIJSBERT PRAST
KLAAS ROOZENDAAL
BY
Frank R. Jifon
AGENT

United States Patent Office 3,302,392

Patented Feb. 7, 1967

3,302,392

DEVICE COMPRISING AT LEAST ONE SEALING ELEMENT BETWEEN TWO COAXIALLY ARRANGED ELEMENTS WHICH ARE MOVABLE WITH RESPECT TO EACH OTHER

Herman Fokker, Roelf Jan Meyer, Gijsbert Prast, and Klaas Roozendaal, all of Emmasingel, Eindhoven, Netherlands, assignors to North American Philips Company, Inc., New York, N.Y., a corporation of Delaware Filed May 27, 1965, Ser. No. 459,375

Claims priority, application Netherlands, May 29, 1964, 64/06027

10 Claims. (Cl. 60—24)

Figure 1:
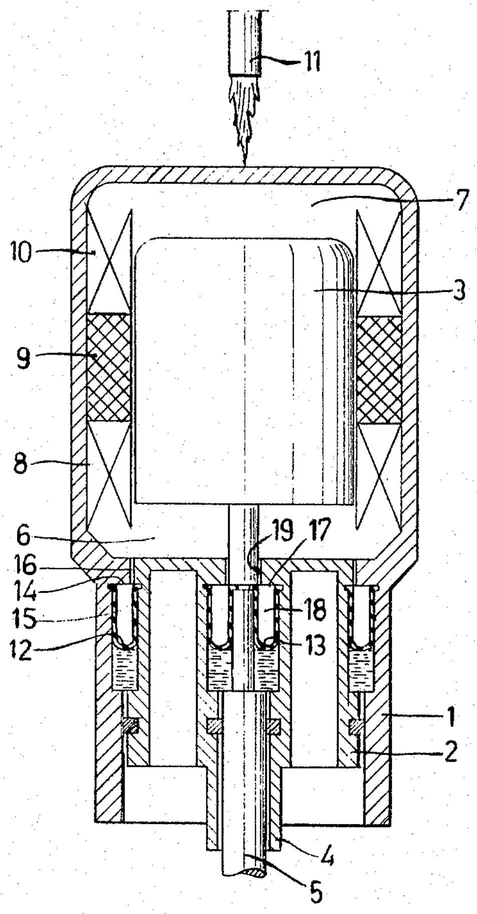

The invention relates to a device comprising at least one sealing element between two coaxially arranged elements which are movable with respect to each other, for example a cylinder and a piston movable therein, and pressure fluctuations occurring in the working spaces bounded by these elements.

Known devices of the type to which the present invention relates are, for example, hot-gas reciprocating engines, cold-gas refrigerators, compressors, piston expansion machines and combustion engines. During operation of these devices temperatures often occur in the working spaces which are higher or lower than the temperature which is most favorable for a satisfactory effect of the sealing element. Too high sealing temperatures, for example, can occur when the temperature of the surroundings, in which these machines operate, is comparatively high (Red Sea water or desert air) and/or when indirect cooling is used in which, for example, the cooling water has to be cooled through a radiator by means of the ambient air and/or in case of direct air cooling. Too low sealing temperatures can occur, for example, in expansion pistons of cold-gas refrigerators and piston expansion machines. In this case the sealing element may be in the form of a piston ring, a rolling diaphragm, etc.

In sealing elements using piston rings it is important, from a point of view of deterioration, that the temperature of the co-operating surfaces does not become too high.

It has appeared in rolling diaphragm sealing element, that the life of the rolling diaphragm rapidly reduces when the temperature increases. A further drawback of too high a rolling diaphragm temperature is that the gas diffusion increases when the temperature increases.

When, on the contrary, the temperature of the rolling diaphragm becomes too low cracks will occur as a result of the inreased rigidity of the material from which the rolling diaphragm is manufactured, so that the life of the rolling diaphragm is adversely influenced.

The invention is based on the recognition of the fact that the above drawbacks can be avoided by intentionally cooling or heating the sealing element in accordance with the temperature occurring in the working space.

In order to realize the above objective the device according to the invention is characterized in that it comprises one or several additional spaces which communicate through a regenerating element with the working space, which additional spaces show volume variation which have a phase difference with respect to the pressure fluctuations occurring in those spaces, the sealing element being directly or indirectly in heat conducting contact with the medium in that in a further space or spaces, a temperature difference prevails during operation between the medium in that further space and the sealing element. Spaces which show volume variations which have a phase difference with respect to the pressure fluctuations occurring in those spaces are to be understood to mean herein spaces the volume of which is varied with respect to the pressure with a phase difference such that $\oint$ p.d.v. is not equal to zero. The term $\oint$ p.d.v. refers to the line integral around a closed curve of one p.d.v. cycle. In this manner it is possible to create spaces in which substantial expansion occurs (production of cold) or substantial compression occurs (production of heat). By directly contacting the medium in these spaces with the sealing element or by bringing the walls of these additional spaces in heat conducting contact with the sealing element, the rolling membrane is consequently cooled or heated in accordance with the type of space with which one has to do.

A device according to the invention in which during operation temperatures occur in the working space which are higher than is desirable for a satisfactory effect of the sealing element is characterized in that the volume variations of the said additional spaces lead in phase with respect to the pressure fluctuations.

Leading in phase of the volume variations of the additional space with respect to the pressure variations is understood to mean herein a phase difference between pressure and volume variations such that the line integral around a closed curve $\oint$ p.d.v. is positive. This means that we have to do with an expansion space in which the gas becomes colder by expansion and withdraws thermal energy from its surroundings. The sealing element which is in a heat-conducting contact with the gas in this additional space or with the walls of that additional space will consequenlty be cooled. In this case high temperatures may occur in the working space without the sealing element being adversely influenced by it.

In a further device according to the invention in which during operation temperatures occur in the working space which are lower than is desired for a satisfactory operation of the sealing element, the volume variations of the said further space lag in phase with respect to the pressure fluctuations.

Lagging in phase of the volume variations of the additional space with respect to the pressure variations is understood to mean herein that there is a phase difference between pressure and volume variations such that the line integral around a closed curve $\oint$ p.d.v. is negative, in which case we then have to do with one compression space. So in this space substantial compression will occur in which the gas becomes warmer. By bringing the gas itself or the walls of the spaces in which the gas is contained in a heat-conducting contact with the sealing element, the sealing element is consequently heated so that it experiences no disadvantageous influence of the low temperatures which prevail in the working space.

A favorable embodiment of the device according to the invention in which the sealing element is a rolling diaphragm sealing element is characterized in that the additional space is formed by the part of the working space adjoining the rolling diaphragm, the said additional space being separated from the rest of the working space by a movable sealing element between the elements which are movable with respect to each other, at least one of the elements having a stepped construction such that the movable sealing element has a diameter which is not equal to the effective diameter of the rolling diaphragm. In this further embodiment the gas in the additional space consequently is in direct contact with one side of the rolling diaphragm. The effective rolling diaphragm diameter is understood to mean herein that sealing diameter which would have the same effect as the rolling diaphragm sealing element and which lies approximately centrally between the diameters of the surfaces along which the rolling diaphragm uncoils.

The desired volume variations are obtained by a simple stepped construction of the movable elements so that no additional moving components need be introduced. Since the additional space must communicate with the working space through a regenerating element, the sealing element in this embodiment between the additional space and the working space may be constituted by a narrow gap between the elements which are movable with respect to each other, the said narrow gap also serving as a regenerating element. Alternately it is possible to incorporate a regenerator in either of the two movable elements.

Since the rolling diaphragm is usually manufactured from a material which has poor heat-conducting properties, it may be desirable to heat or cool both sides of the rolling diaphragm intentionally. This could be effected by bringing both sides directly or indirectly in a heat-conducting contact with an additional space.

In a further favorable embodiment of the device according to the invention those parts of at least one of the movable elements along which the rolling diaphragm uncoils are manufactured from a heat-conducting material, in which these parts on their sides of the rolling diaphragm facing the working space are provided with heat-transmitting surfaces along which the medium flows on its way from the additional space to the regenerating element and back. In this manner one side of the rolling diaphragm is in direct contact with the medium in the additional space, while the other side of the rolling diaphragm uncoils on surfaces which are in a heat-conducting contact with the medium which flows from the additional space to the regenerator and back, which surfaces are consequently cooled also by the said medium. So in this manner cooling of both diaphragm sides is effected with one additional space.

A further favorable embodiment of the device according to the invention is characterized in that at least one of the movable elements is manufactured from a heat-conducting material at least at the area where the sealing cooperates with these elements, the said element being provided with one or more recesses in which piston-shaped members can move, the additional space or spaces bounded by the recesses and the piston-shaped members communicating with the working space through at least one regenerating element, parts of the wall of the additional space or spaces and/or parts of the wall of the ducts through which the medium flows on its way from the additional space or spaces to the regenerating element and back being in a heat-conducting contact with the parts of the wall of the said element with which the sealing cooperates. So in this embodiment the medium in the additional spaces is in indirect contact with the sealing through a heat-conducting contact.

For a better contact between the medium which flows from the additional spaces to the regenerators and the parts which form the heat-conducting communication, a further favorable embodiment of the device according to the invention is characterized in that the additional spaces communicate with the regenerating element through one or more narrow ducts.

According to a further favorable embodiment of the device according to the invention the additional spaces are provided in the piston, the regenerators through which those spaces communicate with the operating space being included in a layer of heat insulating material which is provided on the end face of the piston.

The device according to the invention can particularly readily be used in hot-gas reciprocating engines and cold-gas refrigerators or heat pumps operating according to the reversed hot-gas reciprocating engine principle. In addition these devices can readily be used in compressors and piston expansion machines.

In order that the invention may readily be carried into effect, it will now be described, by way of example, with reference to the drawing in which a number of embodiments are diagrammatically shown.

FIGS. 1 to 7 diagrammatically show a number of embodiments of hot-gas engines in which rolling diaphragms are used as a sealing between the piston and the cylinder and between the piston and the displacer rod, the said rolling diaphragms being cooled by an additional expansion space.

Figure 8:
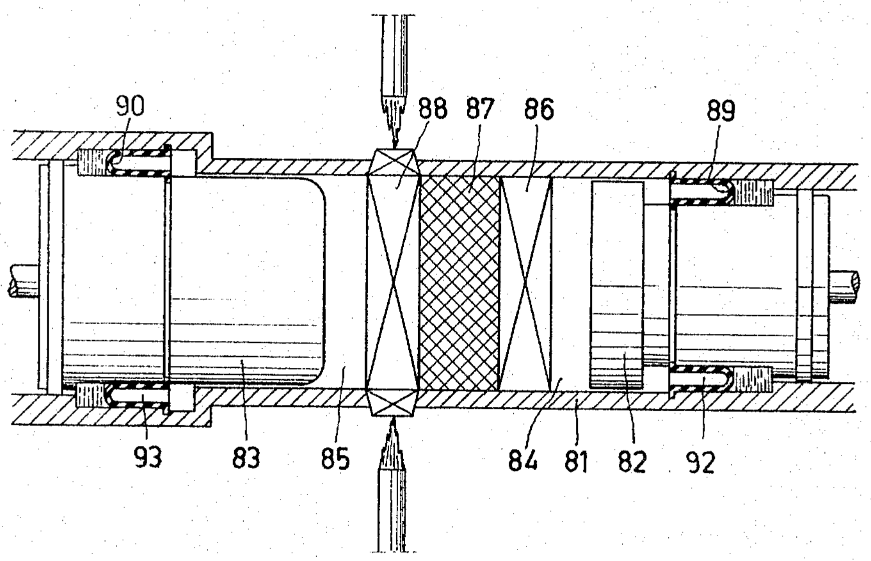
Figure 9:
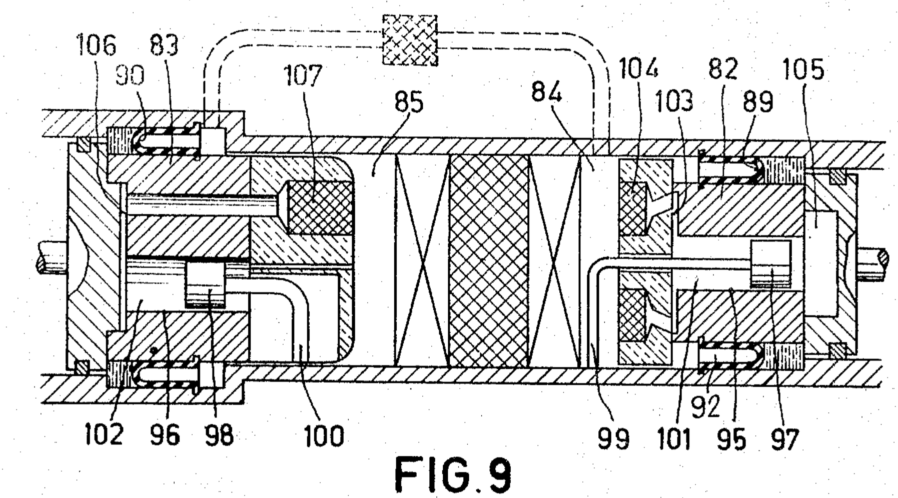

FIGS. 8 and 9 diagrammatically show in a cross-sectional view two hot-gas reciprocating engines of the two-piston-type.

Figure 10:
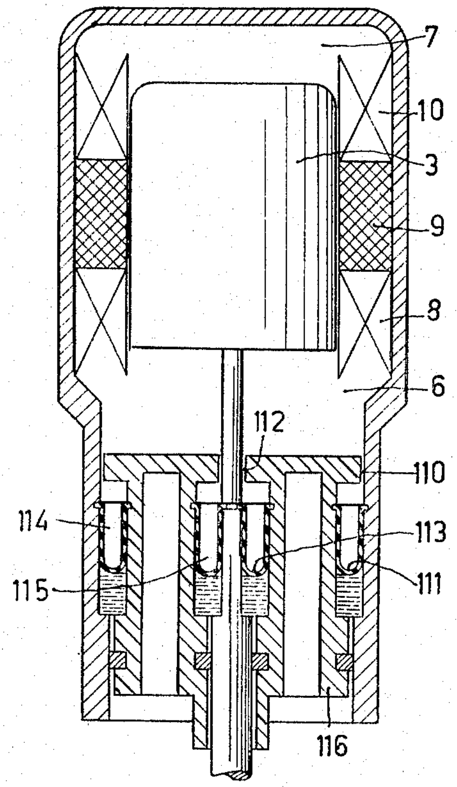
Figure 11:
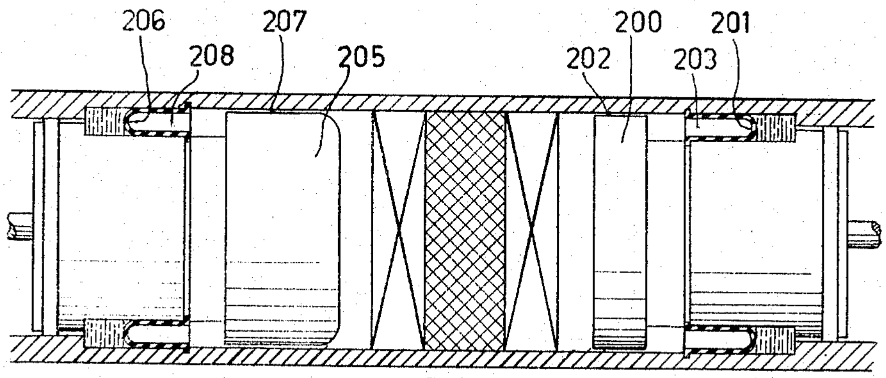

FIGS. 10 and 11 diagrammatically show a cross-sectional view of a cold-gas refrigerator of the displacer type and a cold-gas refrigerator of the two-piston-type.

Figure 12:
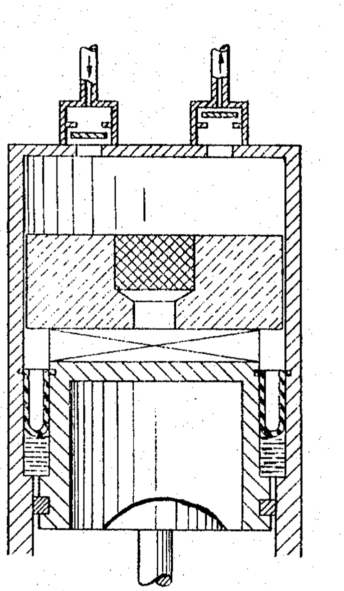

FIG. 12 diagrammatically shows a cross-section of a compressor.

Figure 13:
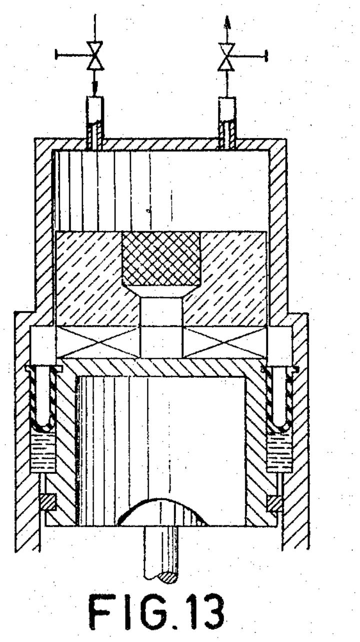

FIG. 13 diagrammatically shows a cross-section of a piston expansion machine.

Figure 14:
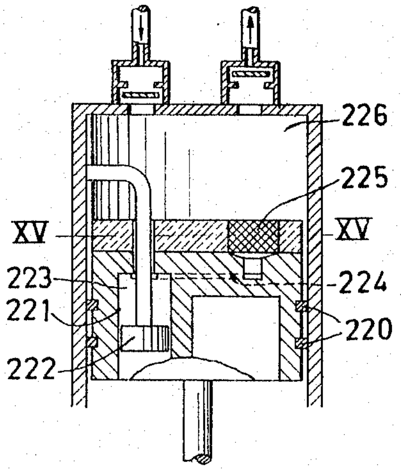
Figure 15:
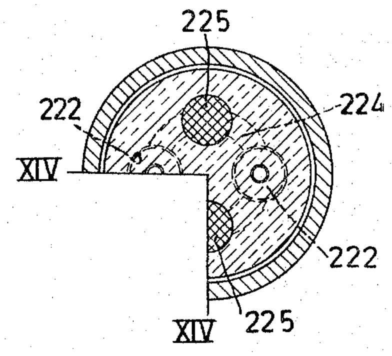

FIGS. 14 and 15 diagrammatically show two cross-sections of a compressor in which the sealing between the piston and the cylinder is effected by piston rings.

FIG. 1 diagrammatically shows a hot-gas engine which comprises a cylinder with a piston 2 and a displacer 3 movable therein. The piston 2 and the displacer 3 respectively are connected, through a piston rod 4 and a displacer rod 5 respectively, to a gearing (not shown) which can move the displacer and the piston in phase relation with respect to each other. On its upper side the piston 2 adjoins a compression space 6 and the top side of the displacer adjoins the expansion space 7. The expansion space 7 and the compression space 6 communicate with each other through a cooler 8, a regenerator 9 and a heater 10. Thermal energy is supplied to the head of the hot-gas reciprocating engine by a burner 11. The sealing between the cylinder 1 and the piston 2 is formed by a rolling diaphragm sealing element 12 which is supported by a liquid and the construction and operation of which are described in Dutch Patent No. 112,769. The sealing between the piston 2 and the displacer rod 5 is effected by a rolling diaphragm sealing element 13. On the side of the rolling diaphragm 12 facing the working space the cylinder 1 has a stepped construction as a result of which an annular surface 14 is formed. The space 15 inside the rolling diaphragm communicates through the narrow gap 16 with the compression space 6. At the area of the rolling diaphragm 13, namely on the side of the said rolling diaphragm which faces the compression space 6, the piston 2 also has a stepped construction as a result of which the annular surface 17 is formed. The space 18 inside the rolling diaphragm 13 communicates with the compression space 6 through the narrow gap 19. During operation, temperatures will occur in the compression space 6 which are too high for a satisfactory operation of the rolling diaphragm. Since the cylinder 1 is of a stepped construction the volume of the space 15 will be varied so that the volume variations lead with respect to the pressure fluctuations. As a result of this substantial expansion will occur in the space 15 as a result of which cooling of the rolling diaphragm is obtained. The narrow gap 16 serves as a regenerating element. The same holds for the space inside the rolling diaphragm 13 but in this case the annular surface 17 moves with the piston 2. This is necessary in connection with the movements of the piston and the displacer rod with respect to each other.

That the space 15 forms an expansion space may be explained as follows. In a hot-gas engine of the displacer type the piston 2 which also varies the volume of the working space in fact is an expansion piston because the gas does work on this piston. The rolling diaphragm 12 moves in phase with the piston 2. This entails that in the space 15 formed by the rolling diaphragm 12 and the surface 14 rigidly connected to the cylinder substantial expansion will take place since the rolling diaphragm 12 operates as an expansion piston. As a result of this the medium in the space 15 will withdraw thermal energy from its surroundings and cool the rolling diaphragm 12.

That the space 18 also is an expansion space is somewhat more difficult to understand since in that case we have to do with the relative movements of the piston 2 and the displacer rod 5. The part of the rolling diaphragm 13 which causes volume variations moves in phase with the displacer. The surface 17 which adjoins the space 18 at its upper side moves in phase with the piston 2. Since the face 17 faces the side remote from the end face of the piston 2 and the rolling diaphragm is directed opposite to the lower side of the displacer, the volume variations of the space 18 will be in counterphase with the volume variations of the compression space so that the space 18 forms an expansion space, that is to say, the line integral around a closed curve $\oint$ p.d.v. again is positive. The medium in that space will consequently again withdraw thermal energy from its surroundings.

In FIGURE 1 the spaces 15 and 18 communicate with the working space through narrow gaps 16 and 19 respectively. In this case the walls of these gaps are constructed so that they can withdraw or supply thermal energy from or to the medium which flows through the gaps.

Instead of these narrow gaps a normal regenerator may be used as a regenerating element. This diagrammatically shown in FIG. 2 for the rolling diaphragm 12. The operation of this device is further wholly identical to that of the device shown in FIG. 1.

Figure 2:
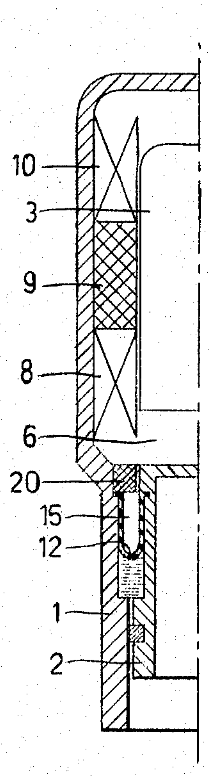
Figure 3:
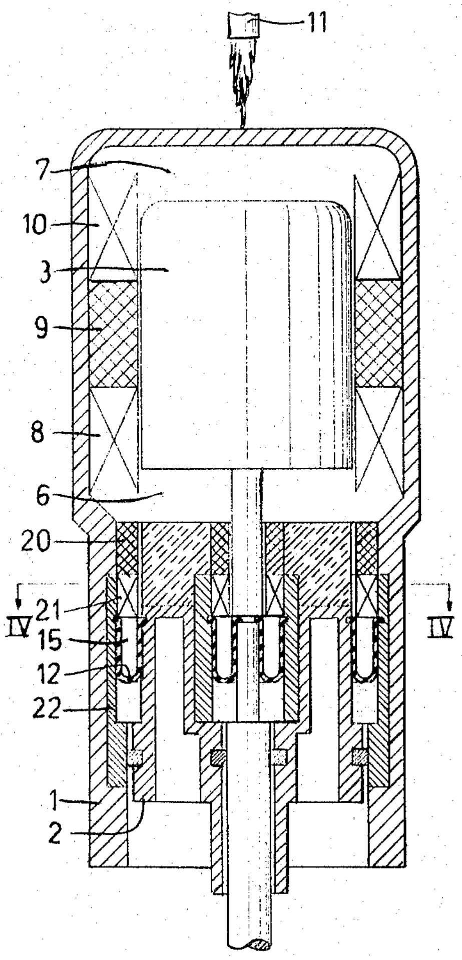

The regenerator 20 which in FIG. 2 is shown in the gap between the piston 2 and the cylinder 1 may be housed, if desired, in the cylinder or piston. In this case, however, the stepped shape of the cylinder must be maintained to obtain the correct volume variations, for which purpose a piston spring may be present in the gap between the piston and the cylinder.

In FIGURES 1 and 2 rolling diaphragms are shown which, on their sides facing the compression chamber are cooled by the medium in the spaces 15 and 18. Since the piston and the cylinder are usually manufactured from a heat-conducting material it may occur that the walls along which the diaphragm uncoils and/or the supporting liquid become to warm. Because the material from which the rolling diaphragm is manufactured has poor heat-conducting properties, the side of the rolling diaphragm remote from the spaces 15 or 18 may become too warm as a result. In order to avoid this danger, the hot-gas engine shown in FIGS. 3 and 4 comprises, between the rolling diaphragm and the regenerator 20, a heat exchanger 21 which is formed by a number of heat-transmitting surfaces which are in a heat-conducting connection with a readily heat-conducting sheath 22. This sheath is connected to the cylinder wall in a manner such that the rolling diaphragm 12 uncoils along it. In this construction the medium, on its way from the space 15 to the compression space 6 and back, will always pass the heat exchanger 21. In this case this medium supplies its cold to the heat exchanger. The heat exchanger also cools the sheath 22 so that the rolling diaphragm 12 uncoils along a cooled surface and both sides of the rolling diaphragm are consequently cooled. The same construction may be used for the rolling diaphragm 13.

Figure 5:
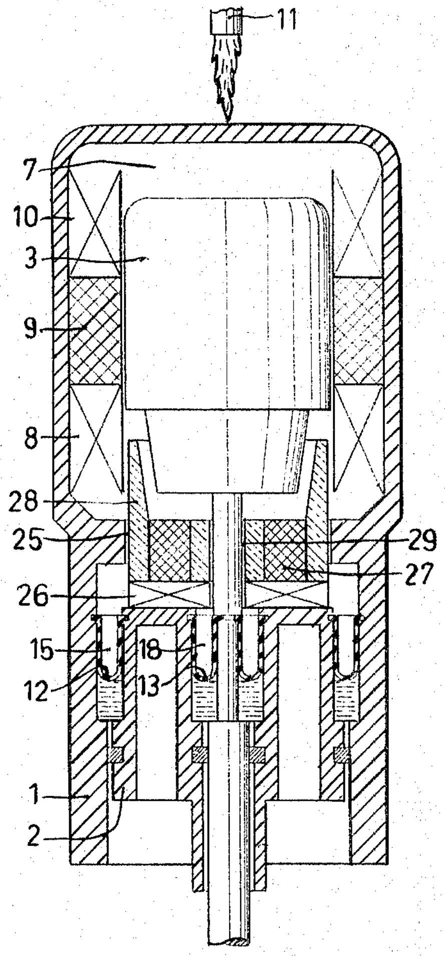
Figure 4:
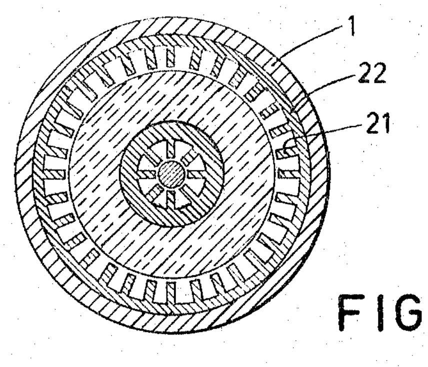

FIG. 5 shows a hot-gas engine in which, to obtain the correct volume variations of the further spaces, again gap sealings 25 and 29 respectively are used. In this case, these gap sealings have a smaller diameter than the effective diameter of the rolling diaphragm as was the case in the engines shown in the preceding FIGS. 1–4. The effective diameter of the rolling diaphragm is understood to mean that diameter which has the same effect as the rolling diaphragm sealing. In the embodiment shown in FIG. 5 the spaces 15 and 18 communicate with a regenerator 27 in the piston 2 through a heat exchanger 26. This regenerator 27 is incorporated in a layer of heat-insulating material 28 which is constructed in a special manner so as to keep the unprofitable space small and yet guarantee a ready guide and sealing between the piston 2 and the cylinder 1. The piston 2 is manufactured from heat-conducting material so that the cold produced in the spaces 15 and 18 is transmitted through the heat exchanger 26 and piston body to the side of the rolling diaphragms 12 and 13 remote from the working space.

Figure 6:
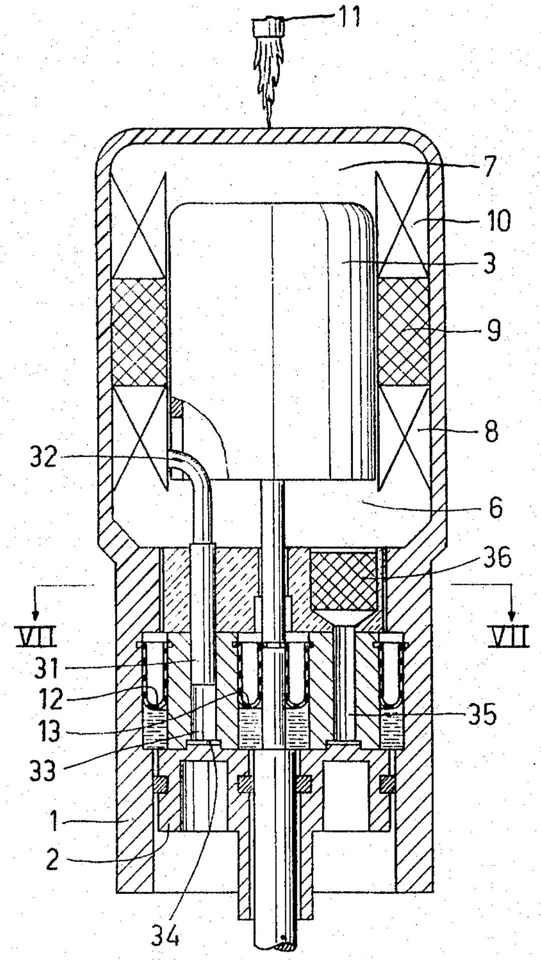
Figure 7:
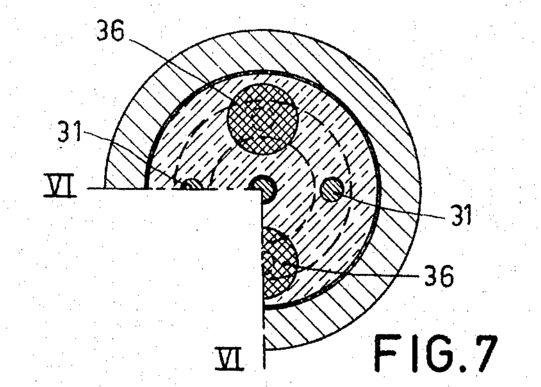

FIGURES 6 and 7 diagrammatically show a hot-gas engine in which besides the spaces inside the rolling diaphragms 12 and 13 other additional spaces are present. In this case the piston 2 comprises recesses or spaces 33 in each of which a piston-shaped body 31 is included. The members 31 communicate with the cylinder 1 through arms 32. Recesses in the displacer and piston ensure that the arms 32 when the displacer and the piston move do not come in contact with these elements. When the piston 2 moves, the volume of the spaces 33 is varied by the piston-shaped members 31. These spaces communicate with the compression space 6 through a narrow annular gap 34 and ducts 35 and regenerators 36. The volume variation of the spaces 33 again is such that the pressure and volume variations give a positive line integral around a closed curve $\oint$ p.d.v. so that these spaces consequently again form expansion spaces. The cold produced in those spaces is transmitted to the piston material as a result of the ready contact of the medium in the narrow gap 34 with the piston 2, so that the bearing surface of the rolling diaphragms and/or the supporting liquid is again sufficiently cooled. The rolling diaphragms will again not be subjected to too high compression temperatures.

What was said above about the use of rolling diaphragms in hot-gas engines of the displacer type naturally also holds for engines of the two-piston-type.

For illustration FIG. 8 diagrammatically shows an embodiment of a two-piston-engine. The cylinder is denoted by reference numeral 81. In this cylinder move a compression piston 82 and an expansion piston 83 shifted in phase with respect to each other. These pistons can vary the volume of a compression space 84 and an expansion space 85. These two spaces communicate with each other through a cooler 86, a regenerator 87 and a heater 88. The sealing between the piston 82 and the cylinder 81 is formed by a rolling diaphragm 89, while the sealing between the piston 83 and the cylinder 81 is formed by a rolling diaphragm 90. For both rolling diaphragms the temperature which prevails in the compression space and expansion space respectively is too high for a ready operation. So additional expansion spaces must be formed in the proximity of these rolling diaphragms for cooling. In the case of the compression piston this is done by giving the said piston 82 a stepped construction on the side of the rolling diaphragm 89 which faces the compression space 84 so that a gap sealing is obtained which has a diameter which is larger than the effective rolling diaphragm diameter.

As a result of this a space 92 is created in which volume variations occur which are caused by rolling diaphragm 89 and which are in counterphase with the volume variations caused by the upper side of the compression piston 82. From this it immediately follows that the space 92 forms an expansion space.

At the area of the rolling diaphragm 90, namely on that side of the diaphragm which faces the expansion space, cylinder 81 has a stepped construction. The resulting gap sealing between the piston 83 and the cylinder 81 has a diameter which is smaller than the effective rolling diaphragm diameter.

As a result of this a space 93 is formed in which volume variations occur which are caused by the rolling diaphragm 90 which are in phase with the volume variations caused by the upper side of the expansion piston 83. From this it follows that the space 93 is an expansion space.

The rolling diaphragms 89 and 90 are cooled by the medium in the expansion spaces 92 and 93, as a result of which a long life and a small gas diffusion are guaranteed.

Naturally, in these engines again it is possible to use regenerators, if required together with heat exchangers, instead of regenerating gaps which conduct the produced cold to the bearing surfaces of the rolling diaphragm for cooling the other side of the rolling diaphragm.

Alternatively it is possible again to provide recesses in the pistons in which piston-shaped members move which vary the volumes of further spaces such that again substantial expansion occurs in these spaces. A possible embodiment of such an engine is diagrammatically shown in FIG. 9.

In this figure the pistons 82 and 83 are provided with bores 95 and 96. Movable piston-shaped members 97 and 98 are provided in these bores which communicate with the cylinder wall through arms 99 and 100. The volumes of the additional spaces 101 and 102 respectively are varied by the piston-shaped members 97 and 98 in a manner such that in these spaces substantial expansion occurs. The space 92 communicates with the compression space 84 through a narrow gap 103 and regenerators 104. On the other side of the piston-shaped member 97 there is a buffer space 105. The space 102 communicates with the expansion space 85 through a narrow gap 106 and a regenerator 107. The cold produced in the additional spaces 101 and 102 is conducted through the pistons to the rolling diaphragms 89 and 90 which are readily cooled by it.

In these two-piston-machines the additional space may communicate with the cooler compression space 84 through a regenerator instead of with the warm expansion space. As a result of this the regenerator is less heavily loaded. In FIG. 9 this alternative embodiment is shown in broken lines.

Above, the sealing of pistons in hot-gas engines was discussed. It will be clear that these sealings may alternatively be used in cold-gas refrigerators.

A cold-gas refrigerator of the displacer type, in which the sealing between the piston and the cylinder and between the piston and the displacer rod is constructed as a rolling diaphragm and in which the spaces inside the rolling diaphragm serve as further spaces is diagrammatically shown in FIG. 10. It appears from this figure that, to obtain the correct volume variations in the further spaces, the piston has a stepped construction so that the gap sealing 110 between the cylinder and the piston has a greater diameter than the effective diameter of the rolling diaphragm 111, while the gap sealing 112 between the piston and the displacer rod has a smaller diameter than the effective diameter of the rolling diaphragm 113 in question. As a result of this again two further spaces 114 and 115 respectively are created in which the line integral around a closed curve $\oint$ p.d.v. is positive so that the medium withdraws thermal energy from the rolling diaphragms. The volume variations of the space 114 are in counterphase with the volume variations caused by the upper side of the piston 116. Since the piston 116 in a cold-gas refrigerator is a compression piston (through this piston work is supplied to the medium) this means that rolling diaphragm 111 operates as an expansion piston so that the line integral around a closed curve $\oint$ p.d.v. in the space 114 is positive. With reference to the space 115 the same holds true as what was said about the space 28 of the hot-gas engine. So in this case the space 115 is also an expansion space. The rolling diaphragms are cooled by the cold produced in the expansion spaces 114 and 115 respectively. Naturally, in these cold-gas refrigerators also the constructions of FIGS. 2 to 7 can be used.

FIG. 11 shows a cold-gas refrigerator constructed as a two-piston-machine. In the compression piston 200 which adjoins the comparatively warm compression space the rolling diaphragm 201 must again be cooled. The gap sealing 202 for that purpose has a greater diameter than the effective diameter of the rolling diaphragm 201. As a result of this a space 203 is formed the volume variations of which are in counterphase with the volume variations caused by the compression piston. So again we have to do with an expansion space where the line integral around a closed curve $\oint$ p.d.v. is again positive. The space 203 consequently is an expansion space so that the rolling diaphragm is cooled by the expanding gas.

The expansion piston 205 adjoins the very cold expansion space. As a result of this the danger exists that the rolling diaphragm 206 becomes too cold. To avoid this the gap sealing 207 has a greater diameter than the effective diameter of the rolling diaphragm. As a result of this the line integral around a closed curve $\oint$ p.d.v. of the space 208 will be negative. Since the volume variations are produced in this case by the lower side of the expansion piston we consequently have to do here with a compression space. During compression a quantity of thermal energy will be released which will protect the rolling diaphragm from becoming excessively cold.

In this cold-gas refrigerator also the arrangements of regenerators, heat exchangers, heat-conducting surfaces along which the rolling diaphragms uncoil and constructions of additional spaces as shown in the preceding examples can be used.

In compressors and piston expansion machines also the constructions discussed in the preceding lines may be used to prevent too high or too low rolling diaphragm temperatures. When the temperature tends to become too high one or more additional expansion spaces must be provided and, when the rolling diaphragm temperature becomes too low, one or more additional compression spaces must be provided.

FIGS. 12 and 13 diagrammatically show a compressor and a piston expansion machine respectively. In connection with the above, these figures need no further explanation. The compressor is provided with an additional expansion space and the expansion machine is provided with an additional compression space, which spaces are in a heat-conducting communication with the rolling diaphragm.

The great advantage of the invention is that without the use of an additional cooling device and without additional moving components of construction the rolling diaphragm can be kept at a favorable operating temperature.

Although the drawing shows rolling diaphragms supported by a liquid it will be clear that the invention may equally readily be used in rolling diaphragms which are not supported.

In addition it should be appreciated that the invention is not restricted to rolling diaphragms which face the sealed space with their concave sides but that the invention may alternatively be used in rolling diaphragms which face the sealed space with their convex sides.

In addition it should be appreciated that the invention is not restricted to rolling diaphragm sealing elements but may alternatively be used in normal piston ring sealings. An example of such a sealing is diagrammatically shown in FIGS. 14 and 15 in which, by way of example, a compressor is shown the piston of which is sealed in the cylinder by means of piston rings 220. In order to maintain these piston rings and the piston at a tolerable temperature, the piston is provided with cylindrical recesses 221 in which the piston 222 can move. The pistons 222 vary the volume of the space 223 when they are moved. The space 223 communicates with the compression chamber 226 through a duct 224 and a regenerator 225. The volume of the space 223 is consequently varied in counterphase with the volume of the compression space 226 so that the space 223 forms an expansion space. During the expansion of the medium in the space 223 cold is produced as a result of which the piston and the piston rings 220 are very effectively cooled.

Although in this example a compressor is shown it will be clear that also the sealing between the cylinder and the piston of a combustion engine, hot-gas engine, and so on can be constructed and cooled in this manner.

What we claim is:

1. A thermodynamic reciprocating apparatus comprising cylinder means, a piston means reciprocating in said cylinder means whereby pressure fluctuations occur in the working space bounded by said piston and cylinder means, at least one additional space, a regenerating element, said additional space communicating with said working space through said regenerating element, said additional space having volume variations with a phase difference with respect to the pressure fluctuations in said additional space, a seal being in heat conducting contact with the medium present in the additional space, and a temperature difference prevailing during operation between the medium in the additional space and the seal.

2. A thermodynamic reciprocating apparatus as claimed in claim 1, wherein during operation higher temperatures occur in the working space than is desirable for a satisfactory operation of the sealing, and the volume variations of the said additional space leads in phase with respect to the pressure fluctuation to thereby cause said seal to be cooled.

3. A thermodynamic reciprocating apparatus wherein as claimed in claim 1, during operation lower temperatures occur in the working space than is desirable for a satisfactory operation of the sealing, and the volume variation of the said additional space lags in phase with respect to the pressure fluctuation to thereby cause said seal to be heated.

4. A thermodynamic reciprocating apparatus comprising cylinder means, a piston means reciprocating in said cylinder means whereby pressure fluctuations occur in the working space bounded by said piston and cylinder means, at least one additional space, a regenerating element, said additional space communicating with said working space through said regenerating element, said additional space having volume variations with a phase difference with respect to the pressure fluctuations in said additional space, and a rolling diaphragm seal being in heat conducting contact with the medium present in the additional space, a temperature difference prevailing during operation between the medium in the additional space and the seal, said additional space being formed by the part of the working space adjoining said diaphragm seal, a movable seal separating the additional space from the remainder of said working space and located between said cylinder and piston means, and at least one of said cylinder and piston means having a stepped construction such that said movable seal has a diameter which is unequal to the effective diameter of said diaphragm seal.

5. A thermodynamic reciprocating apparatus as claimed in claim 4 wherein said movable seal between the additional space and the part of the working space is formed by a narrow gap between the piston and cylinder means which are movable relative to each other, the said gap also serving as a regenerating element.

6. A thermodynamic reciprocating apparatus as claimed in claim 4 wherein the regenerating element is formed by a regenerator included in at least one of said piston and cylinder means.

7. A thermodynamic reciprocating apparatus as claimed in claim 4 wherein those parts of at least one of said piston and cylinder means along which said rolling diaphragm uncoils are constituted of a heat conducting material, in which these parts on the side of the rolling diaphragm facing the working space are provided with heat transmitting surfaces along which the medium flows on its way from the additional spaces to the regenerating element and back.

8. A thermodynamic reciprocating apparatus comprising cylinder means, a piston means reciprocating in said cylinder means whereby pressure fluctuations occur in the working space bounded by said piston and cylinder means, at least one additional space, a regenerating element, said additional space communicating with said working space through said regenerating element, said additional space having volume variations with a phase difference with respect to the pressure fluctuations in said additional space, a seal being in heat conducting contact with the medium present in the additional space, and a temperature difference prevailing during operation between the medium in the additional space and the seal, at least one of said piston and cylinder means being constituted of a heat conducting material at least at the area where said seal coacts with said piston and cylinder means, said piston means provided with at least one recess, an additional regenerator element, said additional space bounded by said recess and said piston means communicating with said working space through at least said additional regenerator element, parts of the wall of said additional space through which said medium flows from said additional regenerator element to said additional space and back being in heat conducting relation with the parts of the wall of one of said piston and cylinder means with which said seal coacts.

9. A thermodynamic reciprocating apparatus as claimed in claim 8 further comprising at least one narrow duct for connecting said additional space with said additional regenerator element.

10. A thermodynamic reciprocating apparatus as claimed in claim 8 wherein said additional space is located in said piston means and the additional regenerator element being provided on an end face of said piston means and in communication with said additional space as well as with said working space.

References Cited by the Examiner

UNITED STATES PATENTS

| | | | |
|---|---|---|---|
| 2,618,923 | 11/1952 | Koopmans | 60—24 |
| 3,050,949 | 8/1962 | Meiser | 60—24 |
| 3,204,858 | 9/1965 | Dros | 92—60 |

EDGAR W. GEOGHEGAN, *Primary Examiner.*